United States Patent [19]

Casper et al.

[11] 4,051,214

[45] Sept. 27, 1977

[54] METHOD OF CONTROLLING MONOMER LOSS DURING THE PRODUCTION OF A FIBER-THERMOPLASTIC MATRIX BY IN SITU BULK POLYMERIZATION

[75] Inventors: Richard R. Casper; Myron P. Marander, both of Longview, Wash.

[73] Assignee: Weyerhaeuser Company, Tacoma, Wash.

[21] Appl. No.: 759,603

[22] Filed: Jan. 14, 1977

Related U.S. Application Data

[63] Continuation-in-part of Ser. No. 653,980, Jan. 30, 1976, abandoned.

[51] Int. Cl.² .......................... B29D 7/20; B29D 27/00
[52] U.S. Cl. ..................................... 264/137; 264/37; 264/128; 264/136
[58] Field of Search .................. 264/37, 128, 136, 137; 162/169, 206

[56] References Cited

U.S. PATENT DOCUMENTS

| | | | |
|---|---|---|---|
| 3,051,679 | 8/1962 | Forsyth | 264/128 X |
| 3,188,369 | 6/1965 | Guthrie | 264/128 |
| 3,301,739 | 1/1967 | Vanderbilt | 264/137 X |
| 3,350,475 | 10/1967 | Watnabe | 264/136 X |
| 3,549,509 | 12/1970 | Casalina | 264/128 X |
| 3,660,223 | 5/1972 | Casalina | 264/128 X |

FOREIGN PATENT DOCUMENTS

505,885   1954   Italy ........................... 264/37

*Primary Examiner*—Richard R. Kucia

[57] ABSTRACT

An improved method of controlling monomer loss during the production of a fiber-thermoplastic matrix by in situ bulk polymerization is described, the improvement allowing polymerization to greater than 25% polymer content by weight of the matrix within less than eight minutes. A fibrous web of less than 0.25-inch thickness, saturated with a liquid phase polymerizable composition containing a vinyl monomer and a thermally activated free radical initiator at ½-10% by weight of the composition is polymerized under controlled conditions in which the matrix is: (a) confined between heat transfer surfaces at 0.2-20 psig; (b) heated to a temperature sufficient to initiate polymerization but below the boiling point of the composition; (c) increased in temperature as the boiling point of the composition increases during polymerization while still maintaining the temperature below the boiling point of the composition; and (d) increased in temperature above the boiling point of the composition when the desired polymer content is obtained in order to evaporate residual monomer from the matrix. The resulting matrix is suitable for molding by the application pressure into useful products.

8 Claims, 1 Drawing Figure

METHOD OF CONTROLLING MONOMER LOSS DURING THE PRODUCTION OF A FIBER-THERMOPLASTIC MATRIX BY IN SITU BULK POLYMERIZATION

REFERENCE TO PREVIOUS APPLICATION

This application is a continuation-in-part of application Ser. No. 653,980, filed Jan. 30, 1976, and now abandoned.

BACKGROUND OF THE INVENTION

This invention relates to controlling monomer loss in the manufacture of fiber-thermoplastic matrix so that greater than 25% polymer by weight of the matrix is formed in the matrix while polymerization time is reduced to less than eight minutes. More specifically, monomer loss from a fibrous web of less than 0.25-inch thickness, impregnated with a polymerizable composition and subjected to in situ bulk polymerization is controlled by applying careful pressure and temperature controls during the polymerization.

Fiber-plastic combinations are well known. Resins have been used to enhance the wet strength of paper and as binding agents in cellulosic sound-insulating and filling materials. Patents that show a moldable fiber-thermoplastic matrix for use in decorative lamnnates, luggage shells, and corrugated material are U.S. Pat. Nos. 3,119,731, 3,121,656, 3,203,851; German Pat. No. 1,186,315; and Canadian Pat. No. 763,202. In these patents the cellulosic-thermoplastic fiber matrix is made by adding a finely divided thermoplastic polymer to the cellulosic fiber, usually into an aqueous suspension of the fiber. A fiber-thermoplastic polymer composition is obtained which is dried and subjected to heat and pressure to produce a densified composite article.

U.S. Pat. No. 3,232,824 discloses a process comprising: (1) addition of a polymerizable monomer or monomer/polymer emulsion to an aqueous suspension of cellulosic fiber; (2) emulsion polymerization of the monomer in the aqueous suspension; (3) removal of the water to produce a web; (4) drying; and (5) molding the dried material under heat and pressure. Since polymerization occurs in aqueous suspension, water must be removed from the fiber web and the web dried before the impregnated material can be molded and shaped by heat and pressure. Further, in emulsion polymerization, surfactants are usually required to stabilize the monomer or monomer/polymer emulsion, adding additional expense to the overall process. In addition, emulsion polymerization processes are quite time-consuming, usually taking hours to accomplish a useful amount of polymerization and polymer deposition.

Prior art showing production of fiber-polymer compositions by in situ polymerization is considerably more limited. Bulk polymerization of polymerizable monomer in a fiber matrix, that is, polymerization of substantially all of a reactant liquid consisting essentially of monomer or monomer/polymer without use of any emulsion system or medium, eliminates the drying and surfactant requirements but creates other problems. If vinyl monomers are polymerized in a fiber matrix, monomer losses from evaporation during polymerization can be prohibitively high due to the great volatility of such monomers. Further, the polymerization of vinyl monomers is generally an exothermic reaction once initiated, and without the "heat sink" capacity of an emulsion medium, the temperature and pressure conditions of bulk polymerization must be closely controlled to prevent runaway reactions which produce charred product and sometimes explosions. Close control is particularly critical when extremely rapid polymerization is sought by using high concentrations of heat activated polymerization initiators.

A non-emulsion polymerization of vinyl monomers in a cellulosic matrix is suggested in U.S. Pat. No. 3,083,118. Disclosed is a process of selectively polymerizing vinyl monomers within and/or upon host polymeric materials, such as wood fibers, having ion exchange capacity. The patentee begins with a host material having inherent ion exchange capacity, or chemically attaches an ion exchange material to the host, then chemically attaches a polymerization catalyst or initiator to the ion exchange material, and finally exposes the treated host material to a monomeric liquid which may be a monomeric solution, suspension, or emulsion to cause polymerization essentially only at sites on the host material of chemically bound catalyst or initiator. The process has many disadvantages. The amount of polymer deposition possible depends upon the ion exchange capacity of the host material. The process is slow (1) because of the need to chemically attach the catalyst or initiator to the host material, and to wash away excess catalyst or initiator before polymerization can be attempted, and (2) because it is possible to secure only a relatively small amount of initiator or catalyst to the host material due to its limited ion exchange capacity. Further, the patentee's prime concern, as suggested by each of his 181 illustrative examples, is in the areas of emulsion, suspension, or solution polymerization, which have inherent problems of their own as a result of the carrier liquids used in those processes.

In situ bulk polymerization of vinyl monomers saturating 1 inch wood blocks is shown in an article by Beall, Meyer and Skaar, "Direct RF Heat Curing of Wood Plastic Composites," 16 *Forest Products Journal*, No. 9 at 90 (September 1966). In Beall et al, aspen and basswood blocks were soaked in a polymerizable composition consisting of methyl methacrylate monomer and up to ½% by weight of the composition of a thermally activated free radical initiator such as benzoyl peroxide for 15-25 minutes. Polymerization was initiated by the heat provided by a constant temperature water bath regulated at 68° C. A thermo-couple inserted in the block recorded the center temperature changes as the polymerization proceeded to completion from initiation. The temperature measurements were plotted as a temperature vs. time curve and show exothermic peaks during the polymerization at about 150° C, well above the boiling point of the pure monomer at 100° C. No attempt was made to control the temperature of the polymerization reaction. The only effort to control monomer loss was the wrapping of the saturated blocks in aluminum foil. It was noted by Beall that some losses of monomer occurred through evaporation and that there was a residual of uncured monomer in the blocks after process completion. Vacuum drying was found to be necessary to remove uncured monomer to change the polymer from the rubbery to the rigid state. The minimum time necessary to effect polymerization shown by Beall was about 70 minutes, when employing direct heating. Beall does show that an increase in peroxide concentration from 0.2 to 0.5% by weight of the polymerizable composition reduces the time to the exothermic peak. Beall does not anywhere suggest that monomer loss may be minimized by controlling temperatures, thereby allowing faster processing times.

Marks, in U.S. Pat. No. 2,516,064, describes a process for polymerization of a dimethacrylate ester of a glycol or mixture of glycols, with the Marks' invention lying in the use of a cobalt nitrate catalyst. While primarily directed to the manufacture of massive castings through bulk polymerization, Marks in passing notes that a product having a hard surface may be made by in situ polymerization of a monomer-coated methacrylate sheet. Marks, concerned with the large castings, does not address the problems of monomer loss and speed of polymerization that are inherent in handling a fast-moving continuous sheet. Marks indicates reaction temperatures of 0° to 130° C, and reaction times of greater than 55 minutes to complete polymerization.

SUMMARY OF THE INVENTION

This invention relates to an improved process wherein monomer loss is controlled during the manufacture of a fiber-thermoplastic matrix by in situ bulk polymerization of a fibrous web less than 0.25 inch thick impregnated with a polymerizable composition comprising a monomer and a thermally activated free radical initiator such that the matrix after polymerization contains at least 25% polymer by weight and the bulk polymerization is completed in less than 8 minutes, comprising (a) confining the impregnated web matrix between heat transfer surfaces wherein the matrix is subjected to a pressure of 0.2 to 20 psig; (b) heating the saturated matrix to an initial temperature sufficient to initiate polymerization but below the boiling point of the composition; (c) raising the temperature as the boiling point of the composition increases during polymerization while still maintaining the temperature below the boiling point of the composition; and (d) increasing the temperature above the boiling point when polymerization is nearly complete in order to evaporate residual monomer from the composition.

DESCRIPTION OF THE PREFERRED EMBODIMENTS

Figure 1:
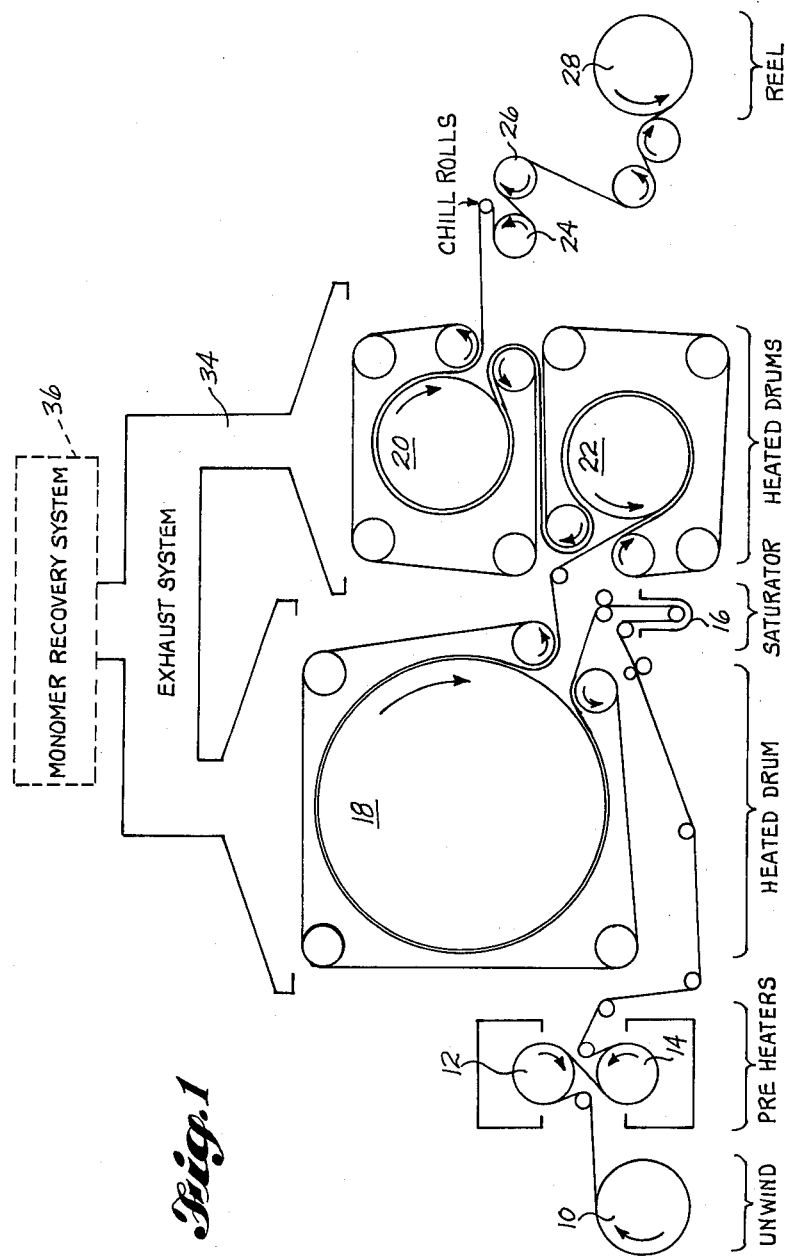
FIG. 1 is schematic elevational view illustrating apparatus useful for carrying out one embodiment of the method of this invention.

The basic raw materials for the process of this invention are fibers, polymerizable monomeric compositions, and polymerization initiators.

The fibers used in the process of this invention are in web form and may be prepared by conventional processes. Suitable fibers include cellulosic fibers (such as bleached or unbleached hardwood or softwood pulps), cotton, rayon, nylon, fiberglass, wool, silk, ramie, hemp, sisal, linen, metal, jute, asbestos, straw, and the like. The fiber web may be either woven or nonwoven, and should be sufficiently high in void volume, as indicated by density, to receive and hold sufficient monomer or monomer/polymer mixture. A density range of from about 0.1 to 0.8 gms./cm.$^3$ and preferably from about 0.3 to 0.5 gms./cm.$_3$ is suitable. The incorporation of common additives to the fiber web appears to have little effect on the saturability of the final product.

The polymerizable monomeric compositions useful in the process of this invention are in liquid form at room temperature and pressure, and cure through vinyl polymerization. The compositions may be liquid phase monomers, mixtures of liquid monomers, solutions of gaseous monomers in liquid monomers or liquid mixtures of monomers and polymers. Olefinic monomers such as vinyl, diene, vinylidene and allyl monomers are suitable. Specific useful monomers include methyl methacrylate, ethyl methacrylate, butyl methacrylate, methyl acrylate, ethyl acrylate, butyl acrylate, octyl acrylate, vinyl acetate, vinylidene chloride, styrene, acrylonitrile, 4-vinyl pyridine, acrylamide, N-vinyl pyrrolidone, acrylic acid, methacrylate acid, itaconic acid, allyl methacrylate, hexyl acrylate and methacrylate, decyl acrylate and methacrylate, lauryl acrylate and methacrylate, stearyl acrylate and methacrylate, allyl acrylate, methallylacrylate, di-chlorostyrene, bis-B-chloroethyl vinyl phosphonate, 4-vinylcyclohexene, vinyl methacrylate, vinyl toluene, divinyl benzene, crotonic acid, B-aminoethylacrylate, methacrylamide, 2-N-morpholinoethyl acrylate, acrolein, styrene sulfonic acid, 2,5-dichlorostyrene, N,N-dimethylaminoethylacrylate acetate, N,N-dimethylaminoethylacrylate base, pentachlorophenoxyacrylate, methylene bis-acrylamide, 2-vinyl pyridine, N-vinyl carbozole, 2-ethylhexyl acrylate, vinyl chloride, vinyl stearate, butadiene, chloroprene, maleic anhydride, methyl 2-chloroacrylate, methylstyrene, diethyl maleate, methacrylonitrile, tetra fluoroethylene, divinylbenzene, and many others.

Monomer mixtures of styrene-butylacrylate, styrene-divinyl benzene, styrene-methacrylate-acrylate, styrene-methylmethacrylate, styrene-acrylate, styrene-methacrylate, or styrene-butadiene may also be used. The acrylates most useful in monomer mixtures are ethyl acrylate, propyl acrylate and butyl acrylate. Monomer/polymer mixtures such as styrene/polyester or styrene-polyester-polystyrene may also be used. Polyesters sold under the trade names "Laminac" by American Cyanamid and "Polylite" by Reichhold Chemicals, Inc., are exemplary of suitable polyesters. The polyesters, it should be noted, are used as polymer additives here, and only in such quantities as will ensure that the resulting polymerized product will be thermoplastic in nature.

The preferred monomer components are styrene, dichlorostyrene, acrylonitrile, divinyl benzene, and esters of acrylic and methacrylic acids, the alcohol portions of said esters containing from 1 to 18 carbon atoms.

A suitable polymerization initiator is incorporated with the polymerizable composition. Any of the known conventional thermally activated free radical initiators for vinyl monomers can be used, as for example, benzoyl peroxide, 2,4-dichlorobenzoyl peroxide, lauroyl peroxide, methylethylketone peroxide, tertiary butyl perbenzoate, 4,4-parachlorobenzoyl peroxide, tertiary butyl peracetate, and azobisisobutyronitrile. The amount of initiator added to the monomer composition is extremely high in comparison to the amounts used in the prior art and may range from 0.5 to 10 weight percent, and preferably from 1 to 5 weight percent, of the polymerizable composition.

Accelerators, such as aromatic amines may be combined with the initiators to assist in initiating polymerization. Other well known accelerators such as mercaptans, anilines, and metallic naphthanates can be used in place of the aromatic amines.

A fiber web is pepared and saturated with a suitable polymerizable composition containing an appropriate polymerization initiator. The saturation may be accomplished by spraying, dipping, padding, doctoring or other well known methods. After saturation, the web may be run through rollers or other devices to lower the monomer or monomer/polymer content in the web to the desired level. The exudate is circulated for reuse.

The amount of polymerizable composition added to the web will depend to a large extent upon the desired final web polymer content. The weight ratio of polymerizable composition to fiber can vary widely, but usually ranges from about 1:3 to 2:1, and is preferably closer to 1:1.

A cellulosic fiber-thermoplastic composition having a thermoplastic polymer content amounting to about 10% of its total weight is moldable and can be used to produce decorative articles such as snack trays, food plates, etc. Such a material, however, does not have the necessary physical characteristics for use as a packaging material for foods, oil, beverages, etc. where a high degree of water and oil resistance is needed. A higher polymer content, i.e., at least 25% by weight and preferably 40% by weight, and up to 70% by weight is necessary when the thermoplastic polymer fiber matrix is to be used in packaging.

The liquid phase polymerizable composition before it is applied to the fibrous web may be partially polymerized to increase its viscocity. The limits of usable viscocity are 0.6 to 10,000 centipoises measured at 75° F. If the viscocity is too low, the fibrous web cannot retain the desired amount of liquid resin. If the viscocity is too high, the liquid resin is not sufficiently fluid to impregnate the fibrous web easily.

Quite unexpectedly, through the process of this invention, it has become possible to produce a useful fiber-thermoplastic matrix product comprising greater than 25% by weight polymer with polymerization times ranging from 1–8 minutes. This result is unexpected for a number of reasons. First, extremely rapid polymerization produces short chain polymers which normally are of little commercial value due to poor physical characteristics such as low tensile and impact strengths. Second, increasing polymerization initiator concentration to speed up the polymerization, as applicants have done, has appeared extremely unattractive. The initiators require the addition of heat before they break down into polymrization promoting free radicals. This heat is known to cause volatile monomer to evaporate from the reaction area before it even begins to polymerize, which not only raises production costs, but limits the amount of polymer which can be incorporated in the final fiber-thermoplastic product. In addition, the polymerization is exothermic, and generates considerable quantities of heat which causes further monomer loss as well as further free radical generation. The increase in free radical generation, of course, increases the rate of polymerization and the resultant generation of heat. Thus, attempting to speed polymerization by raising initiator concentration would be expected to cause runaway reactions, charred products, and even explosions, and in fact these process failures will occur unless the reaction conditions are controlled in a way heretofore unachieved. Applicants have discovered how to control such reactions in situ in fiber webs to permit "autocatalytic" continuous rapid production of polymerized of fiber-thermoplastic products having physical properties such as impact and tensile strengths superior to those of corresponding unmodified pure polymers.

Applicants achieve rapid polymerization by using high initiator concentrations which range from 0.5 to 10%, and preferably from 1 to 5%, by weight of the polymerizable composition. In this process the time allowed for in situ polymerization is less than 8 minutes, preferably in the range of 1 minute to 5 minutes. The final fiber-thermoplastic matrix contains at least 25% polymer or resin calculated as 100 × (weight of resin)/(total weight of the composite matrix). The preferred range is 25 to 70% polymer or resin contained in the final fiber-thermoplastic matrix.

The fiber-thermoplastic matrix of at least 25% polymer content, completed within less than 8 minutes, is possible only because of the careful temperature and pressure regulation scheme provided by this invention. The temperature must be high enough to cause thermal breakdown of the particular initiator being used in order to generate polymerization-promoting free radicals. The temperature must be low enough to permit rapid polymerization without causing significant monomer loss, and without charring or damaging the desired product. Since the polymerization is exothermic once initiated, close temperature control includes the ability to rapidly remove heat as well as to add it. The provision of a suitable "heat sink" such as a liquid filled temperature controlled drum maintained at the desired temperature in the reaction zone can provide such control. Control of the reaction is attained by holding the impregnated web in close contact with a temperature-controlled surface, thereby assuring rapid heating to start and sustain the polymerization reaction, yet sufficient cooling of the exothermic reacting matrix to prevent excess loss of monomer.

A key element of the invention is the concept of increasing the temperature during the reaction period. In the initial stages of the reaction, the temperature must be restricted to a level below the boiling point of the monomer-containing composition to avoid losing excessive amounts of monomer. As the reaction proceeds and the ratio of polymer to remaining monomer increases, the danger excessive loss of monomer correspondingly decreases and the temperature can be safely raised to speed the reaction toward completion.

In order to permit satisfactory heat transfer the thickness of the product is preferably kept below 0.25 inch and the basis weight of the unsaturated fiber web below 600 lbs. per ream. If these values are exceeded, it becomes increasingly difficult to control temperature within the interior of the polymerizing product.

Polymerization pressure must similarly be controlled. Polymerizing under pressure reduces monomer loss by raising the boiling point of the monomer-containing composition. In addition, when pressure is applied by means of a solid surface such as a platen, roll, or steel belt, it serves to seal off monomer escape routes and greatly increase heat transfer capabilities permitting improved temperature control. High pressure in the early stages of polymerization can cause extrusion of the polymerizable composition from the fiber web, and is preferably avoided. Pressures can vary from atmospheric or "contact" pressure to about 20 psig. "Contact" pressure is the minimal pressure required to cause essentially total surface contact between a saturated web and an essentially solid surface such as a platen, drum, belt, or the like. The appropriate polymerization pressure is related to the polymerization temperature, the polymerizable liquid composition, and to the type of fiber in the web. It can be empirically determined for each combination of process variables.

PROCESS OPERATION

To carry out the process of saturating and polymerizing the fiber-monomer composition matrix on a continuous basis, a process and apparatus such as disclosed in FIG. 1 can be used. A roll of fiber web is unwound from roll 10 and fed through and around pre-heaters 12 and 14. The fiber web is then passed over idler rolls into a saturation tank 16 holding the liquid polymerizable composition and a free radical initiator. The web may have a polymer incorporated therein prior to saturation with the liquid polymerizable composition.

From tank 16 the fiber web is brought into contact with a hot, temperature controlled drum 18 which raises the temperature of the web and the polymerizable composition incorporated therein to initiate polymerization. Drum 18 is filled with hot oil which is continuously circulated through a temperature control system. The large quantity of hot oil in the drum acts as a heat sink which can add or remove heat from the polymerization zone. The web is maintained in close contact with the drum 18 by a continuous belt of stainless steel or other suitable material. A series of oil filled heat radiating coils flank portions of the belt to control its temperature. The web then passes over idler rolls to subsequent hot drums 22 and 20, chill rolls 24 and 26, and is wound on roll 28. Drum 22 is also filled with hot oil and is temperature controlled in the same manner as is drum 18. Drum 29 is filled with saturated steam which condenses to add heat to the polymerization zone, or vaporizes to absorb heat should the reaction temperature get too high. Chill rolls 24 and 26 cool the web to end polymerization and to permit satisfactory winding of the web on roll 28. Any convenient number of heated and chilled rolls may be used. Thus the temperatures of hot drums 18, 20 and 22 are continuously maintained at levels sufficient to initiate and maintain polymerization of the polymerizable composition in the web matrix without incurring substantial monomer losses or causing damage or charring of the product. Exhaust system 34 collects any escaping monomer which is recovered by monomer recovery system 36.

In operation, a sheet of paperboard of less than 0.25 inch thickness and a basis weight of less than 600 lbs. per ream is fed continuously into the process from unwind strand at roll 10. The sheet passes over pre-heater drums 12 and 14 to dry the sheet, reducing its moisture content to approximately 1% by weight. The pre-heater drums are heated to approximately 335° F by saturated steam at 100 psig. The sheet is then passed into the saturator tank 16 where it is impregnated with polymerizable liquid composition or resin including the benzoyl peroxide initiator. The liquid composition at this point has a viscocity of 0.6 to 10,000 centipoises at 75° F. The liquid composition impregnates the sheet and the excess is removed by passing through the nip rolls. The impregnated sheet now contains liquid composition in the range of 100 lbs. per 3,000 sq. ft. to 1,000 lbs. per sq. ft., depending upon desired final product characteristics, and it is now ready for further processing to polymerize the liquid composition in situ to form the fiber-thermoplastic matrix.

The sheet enters the temperature-controlled processing equipment, first passing over temperature control drum 18 which is 12 feet in diameter. An annular passage near the circumference of this drum is filled with circulating oil that is maintained at approximately 285° F by an external heating and circulating system. The sheet is held on the drum by a continuous flexible belt that is under tension so as to maintain a pressure on the sheet of approximately 1 lb. per sq. in., holding it in close contact with the temperature control surface of the drum, promoting heat transfer and helping to prevent loss of monomer by evaporation.

In contact with the controlled temperature surface of the drum, the sheet is rapidly heated to the drum temperature. At the selected temperature, initiator concentration, and liquid resin composition, the polymerization reaction is rapid. The reaction is exothermic, giving off heat that must be dissipated if temperature control is to be maintained. Some of the exotherm heat will be spent by supplying the latent heat of evaporation for evaporating a portion of the monomer present. The remainder of the exotherm heat will be transferred to the controlled temperature surface with which the sheet is in contact. The controlled temperature surface provides a double function — heating initially and then cooling as polymerization proceeds. The mechanism that allows this to happen is that the circulating oil keeps the drum temperature constant. When the sheet first comes into contact with the drum, it is colder than the drum and it receives heat from the controlled temperature surface, undergoing an increase in temperature. As polymerization proceeds, the exotherm heat first raises the temperature of the sheet above the temperature of the drum. Because of its higher temperature, the sheet now transfers heat to the controlled temperature surface of the drum, thereby dissipating the exotherm heat of reaction.

In the present equipment, the time the sheet spends in contact with the first drum is approximately one half the total time that will be spent in contact with controlled temperature surfaces. Typically, the in situ bulk polymerization reaction has progressed well toward completion by the time the sheet leaves the first drum. The sheet now passes to the second temperature-controlled equipment 22. This is a circular drum 6 feet in diameter and constructed and operated similarly to the 12-foot diameter drum previously described. On this 6-foot diameter drum also, the sheet is pressed against the temperature-controlled surface by a flexible belt. The temperature of this drum is held constant by circulating oil at a temperature the same or greater than of the first drum. For example, in a styrene monomer composition the temperature is 285° F. When the sheet is discharged from the second drum, the polymerization reaction is substantially complete.

The third drum 20 is also 6 feet in diameter, but is heated to 320° F with saturated steam at 75 lb. psig. On this drum, the sheet is also held in close contact with the drum surface by a flexible belt under tension. The purpose of the higher temperature on this drum is to drive the polymerization reaction to completion and to evaporate remaining monomer.

During all stages of the polymerization reaction, the reaction rate is greater at higher temperatures. But raising the temperature for a styrene monomer-containing composition above 285° F during the early stages of polymerization causes monomer evaporation beyond that allowable by the constraints of desired production speed and final product polymer content. However, as the polymerization progresses, more and more monomer is changed into non-volatile polymer. The concentration of monomer in the sheet becomes low enough that the temperature can be increased and the benefit of accelerated reaction rate with increased temperature can be obtained without evaporating excessive amounts of monomer.

The first two drums, as described above, is to effect the polymerization of a major portion of the monomer originally present at the highest temperature practical without suffering large monomer losses by evaporation. The function of the third drum is to finish the polymerization step as far as it will go under the conditions of initiator level and chemical composition that exist. The reaction will not go all the way to completion because the last few percent of the monomer molecules lose mobility in the rapidly solidifying mass and cannot migrate to a proper position near an activated reaction site while the activated site still has its energy of activation.

Excessive monomer in the final sheet is considered to be a detriment because it softens the sheet and imparts odor and taste to the sheet. The high temperature of the third drum volatilizes the unreacted monomer and leaves the sheet through evaporation.

In operation, the sheet moves through the equipment at a speed of 40 feet per minute for a total time of approximately 2 minutes in contact with the controlled temperature surfaces.

In typical operation of the above described equipment, approximately 30% of the incoming monomer is evaporated and is removed from the sheet as vapor. It is collected and recovered for re-use in the monomer recovery system 36.

EXAMPLE 1

A cellulosic fiber web, comprising a paperboard of 0.040 inch thick with a weight of approximately 265 lbs. per 3,000 sq. ft., is fed through the saturation tank. The polymerizable composition contained in the saturating tank is styrene that has been partially polymerized to 39% by weight polymer solids and 61% by weight styrene monomer. Benzyl peroxide initiator is added at a rate of 3 lbs. per 100 lbs. of liquid resin. The liquid resin composition has a viscosity of 550 centipoises at 75° F. The impregnated sheet contains liquid polymerizable composition to the extent of approximately 290 lbs. per 3,000 sq. ft. and is ready for polymerization. The sheet-matrix is continuously fed into the temperature-controlled section of the process. The first drum 18 is held at a temperature of 285° F. On the first drum the matrix is increased in temperature to initiate the polymerization reaction but its temperature is always held below the boiling point of the monomer-containing composition. The web travels to the second heated drum 22 which is also at 285° F, where upon polymerization is continued until essentially complete. The matrix then travels to the third drum which is heated to 320° F, which temperatures drive the polymerization reaction essentially to completion and evaporates substantially all of the remaining monomer. The resulting final sheet contains resin to the extent of approximately 205 lbs. per 3,000 sq. ft.

It is obvious that certain modifications can be made to the equipment without affecting the overall process. In fact, equipment has been constructed and operated in which the temperature-controlled surface is divided up among a greater number of smaller drums than described above. We have also contained the moving sheet between two flexible belts for continuous containment as it moves around and between the successive drums in the temperature control zones. Other modifications could include methods of preparing the liquid resin and of applying it to the sheet. Modifications could be made in the method of heating or adjusting the temperature of the controlled temperature surfaces, methods of moving the sheet through the temperature control zones, methods of promoting contact or heat transfer between the sheet and the temperature-controlled surfaces, configuration or construction of the temperature-controlled surfaces, and many other modifications that would be apparent to one skilled in the art. Modifications of this nature are often useful, but do not alter the basic premise of our invention.

The resin or polymer content of the finished fiber-thermoplastic matrix may be varied above 25%, as dictated by desired product characteristics. Matrix compositions may range from 25 to 70% polymer by weight of the finished matrix calculated as 100 × (weight of the resin)/(total weight of the composite matrix). Of course, the final resin content will depend upon the content of the polymerizable composition impregnated into the fibrous web as well as the ratio of polymer to monomer in the composition. The chemical makeup of the polymerizable composition will, of course, also affect final resin content in the finished fiber-thermoplastic matrix.

Polymerization temperatures useful in the process of this invention are usually determined empirically for each fiber-polymerization composition combination. If the temperature is too low, the polymerization reaction proceeds too slowly. If the temperature is too high, an excessive amount of monomer is lost by evaporation. For the styrene polymer monomer composition, the temperature which in situ polymerization is controlled may range from 225° F to 350° F. Preferred temperatures are 245° F to 300° F for early stages of the process and 285° F to 325° F for the final stages.

The following examples further describe the inventive process.

EXAMPLE 2

The cellulosic fiber web, styrene monomer-containing polymerizable composition and initiator, are identical with those used in Example 1. The sheet is impregnated with the polymerizable composition to the extent of approximately 260 lbs. per 3000 sq. ft. The sheet-matrix is continuously fed into the temperature-controlled section of the process. The drum temperatures are as follows: drum 18 — 245° F; drum 22 — 265° F; and drum 20 — 295° F. Total contact time with the heated drum surfaces is 3.3 min. as compared with the 1.7 min. total contact time for Example 1. The resulting final sheet contains resin of approximately 220 lbs. per 3000 sq. ft. or about 46% polymer by weight of the finished product matrix.

EXAMPLE 3

Starting materials are identical to Example 2 above. The web is initially saturated to 220 lbs. per 3000 sq. ft. Drum temperatures are as follows: drum 18 - 225° F; drum 22 - 265° F; and drum 20 - 295° F. The web is in contact with the heated drum surfaces for 1.9 min. resulting in a final sheet polymer content of 160 lbs. per 3000 sq. ft. or about 37% by weight.

EXAMPLE 4

Starting materials are identical with the previous examples above. The web is saturated to 206 lbs. per 3000 sq. ft. and is subjected to a drum temperature sequence as follows: drum 18 — 225° F; drum 22 — 265° F; and drum 20 — 295° F, respectively. After a contact time of 1.9 min., the resulting product matrix contains 150 lbs. per 3000 sq. ft. or about 36% by weight.

What is claimed is:

1. In a method for making a moldable, fiber-thermoplastic matrix by in situ bulk polymerization wherein a fibrous web of less than 0.25 inch thickness is impregnated with a liquid polymerizable composition, comprising a monomer and a thermally activated free radical initiator wherein the matrix after polymerization contains at least 25% polymer by weight and said bulk polymerization is completed in less than 8 minutes, the improvement whereby monomer loss is controlled during polymerization, which comprises:

confining the impregnated web matrix between heat transfer surfaces wherein the matrix is subjected to a pressure of 0.2 to 20 psig;

heating the impregnated matrix to an initial temperature sufficient to initiate polymerization but below the boiling point of the polymerizable composition;

raising the temperature as the boiling point of the composition increases during polymerization while still maintaining the temperature below said boiling point; and increasing the temperature above the boiling point when polymerization is nearly complete in order to evaporate residual monomer from the composition.

2. The method of claim 1, wherein heating the matrix to an initial temperature, raising the matrix temperature during polymerization and increasing its temperature above the residual monomer boiling point, comprises: controlling said temperatures step wise.

3. The method of claim 2, wherein controlling said temperatures step wise, comprises:

controlling said temperatures between 240° F and 320° F, while maintaining said temperature at least 5° F below the boiling point of the polymerizable composition until at least 25% polymer by weight of the matrix is attained; and increasing thereupon said temperature above the boiling point of the remaining composition.

4. The method of claim 3, wherein said impregnated matrix comprises a cellulosic web impregnated with a monomer selected from the group consisting of styrene, di-chlorostyrene, acrylonitrile, divinyl benzene, and esters of acrylic and methacrylic acids, the alcohol portions of said esters containing from 1 to 18 carbon atoms and 0.5–10% of a thermally activated free radical initiator.

5. In a method for making a moldable, fiber-thermoplastic matrix by in situ bulk polymerization wherein a cellulosic web of less than 0.25 inch thickness and of basis weight less than 600 lbs. per ream is impregnated with a liquid polymerizable composition comprising styrene monomer and a thermally activated free radical initiator of 0.5–10% of said composition wherein the matrix after polymerization contains at least 25% polymer by weight and said bulk polymerization is completed in less than 8 minutes, the improvement whereby monomer loss is controlled during polymerization which comprises:

confining the impregnated web matrix between heat transfer surfaces wherein the matrix is subjected to a pressure of 0.2–20 psig;

heating the impregnated matrix to an initial temperature of 225°–285° F to initiate polymerization but below the boiling point of the polymerizable composition;

removing heat from the matrix to maintain the temperature at 225°–285° F until said matrix contains at least 25% polymer; and increasing said matrix temperature to 320°–350° F to evaporate excess monomer and complete the polymerization.

6. The method of claim 5, wherein heating to initiate polymerization, removing heat during polymerization and increasing heat to complete polymerization of the matrix is controlled step-wise.

7. The method of claim 6, wherein the steps are at 225° F, 265° F and 295° F, respectively.

8. The method of claim 6, wherein the steps are at 245° F, 265° F and 295° F, respectively.

* * * * *

UNITED STATES PATENT OFFICE
CERTIFICATE OF CORRECTION

PATENT NO. : 4,051,214
DATED : September 27, 1977
INVENTOR(S) : RICHARD R. CASPER and MYRON P. MARANDER It is certified that error appears in the above—identified patent and that said Letters Patent are hereby corrected as shown below:

In column 1, line 27, "lamnnates," should read --laminates,--;

in column 2, line 56, "saturted" should read --saturated--;

in column 3, line 62, "0.5 gms./cm.3" should read --0.5 gms./cm.$^3$--; and in column 7, line 29, "Drum 29" should read --Drum 20--.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*